United States Patent
Ravindra et al.

(10) Patent No.: US 7,161,306 B2
(45) Date of Patent: Jan. 9, 2007

(54) MULTI-PHASE INPUT BALLAST WITH DIMMING AND METHOD THEREFOR

(75) Inventors: Thotakura Venkata Ravindra, Haryana (IN); Ayan Kumar Choudhury, Haryana (IN)

(73) Assignee: Osram Sylvania, Inc., Danvers, MA (US)

( * ) Notice: Subject to any disclaimer, the term of this patent is extended or adjusted under 35 U.S.C. 154(b) by 0 days.

(21) Appl. No.: 11/096,007

(22) Filed: Mar. 31, 2005

(65) Prior Publication Data

US 2005/0269964 A1 Dec. 8, 2005

(51) Int. Cl.
*H05B 37/02* (2006.01)
(52) U.S. Cl. ............... 315/209 R; 315/224; 315/200 R
(58) Field of Classification Search ............... None
See application file for complete search history.

(56) References Cited

U.S. PATENT DOCUMENTS

| | | | |
|---|---|---|---|
| 6,118,288 A | 9/2000 | Kang | |
| 2002/0145894 A1 | 10/2002 | Chen | |
| 2005/0052807 A1 | 3/2005 | Klipper et al. | |
| 2005/0062436 A1 * | 3/2005 | Jin | 315/244 |

FOREIGN PATENT DOCUMENTS

EP 1 168 893 A1 2/2002

OTHER PUBLICATIONS

European Search Report dated Aug. 22, 2006 from corresponding EP Application No. 06005749.4 - 2206, 7 pages.

* cited by examiner

*Primary Examiner*—Tuyet Thi Vo
(74) *Attorney, Agent, or Firm*—Fitch, Even, Tabin & Flannery

(57) ABSTRACT

An apparatus and method for powering a lamp connected to a ballast circuit. The ballast circuit is connected to a first alternating current (AC) source having a first phase and to a second AC source having a second phase for powering the lamp. A first switching circuit is connected between the first AC source and a rectifier circuit. A second switching circuit is connected between the second AC source and the rectifier circuit. A control circuit selectively energizes the first and second switching circuits to provide power from one of the first and second AC sources to the lamp load via the rectifier circuit and an inverter circuit. A detection circuit connected between the first and second AC sources generates a detection signal indicating whether power is being supplied by each the first and second AC sources. The detection signal is provided to a dimming regulation circuit to generate a dim level command signal for dimming the lamp.

17 Claims, 6 Drawing Sheets

MULTI-PHASE INPUT BALLAST WITH DIMMING AND METHOD THEREFOR

TECHNICAL FIELD

The present invention relates to dimmable ballasts for discharge lamps. In particular, the invention relates to a method and apparatus for powering a dimmable ballast from a multi-phase power source.

BACKGROUND OF THE INVENTION

Fluorescent lamps (also known as gas discharge lamps) economically illuminate an area. Due to the unique operating characteristics of fluorescent lamps, the lamps must be powered by a ballast. Electronic ballasts provide a very efficient method of powering fluorescent lamps and for adjusting the illumination level of fluorescent lamps.

Generally, an electronic ballast is driven by a single AC (alternating current) voltage supply having a particular phase. When power factor correction is required, the electronic ballast typically has a boost front-end for converting the AC voltage from an AC power source into a DC (direct current) voltage which has a value greater than the peak voltage of the AC power source. An inverter then converts the DC voltage into high frequency AC power.

It is highly desirable that dimming ballasts be capable of being powered from a multi-phase input. More specifically, it is desirable to have an electronic ballast that can be driven by two different AC voltages supplies supplying AC voltages at different phases.

SUMMARY OF THE INVENTION

In accordance with one aspect of the invention, a ballast circuit is provided for connection to a first alternating current (AC) source having a first phase and to a second AC source having a second phase. The ballast includes a first switching circuit for selectively receiving the first AC source and a second switching circuit for selectively receiving the second AC source. The circuit further includes a control circuit for controlling the first and second switching circuits to provide power from one of the first and second AC sources to the lamp via a rectifier and power factor correction and inverter circuits.

In accordance with another aspect of the invention, a method is provided for powering a lamp connected to a ballast circuit. The method includes supplying a first input signal and a second input signal to the ballast. The method further includes generating first and a second complimentary control signals. The method also includes providing power from one of the first and second input signals to lamp (via a rectifier and power factor correction and inverter circuits) as a function of the first and second control signals.

In accordance in another aspect of the invention, a method is provided for powering a lamp connected to a ballast. The method includes receiving a first alternating current (AC) voltage via a first switching circuit. The method also includes receiving a second AC voltage to via a second switching circuit. The method further includes selectively controlling the first and second switching circuits to provide one of the first and second AC voltages to power the lamp via a rectifier and power factor correction and inverter circuits.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1A:
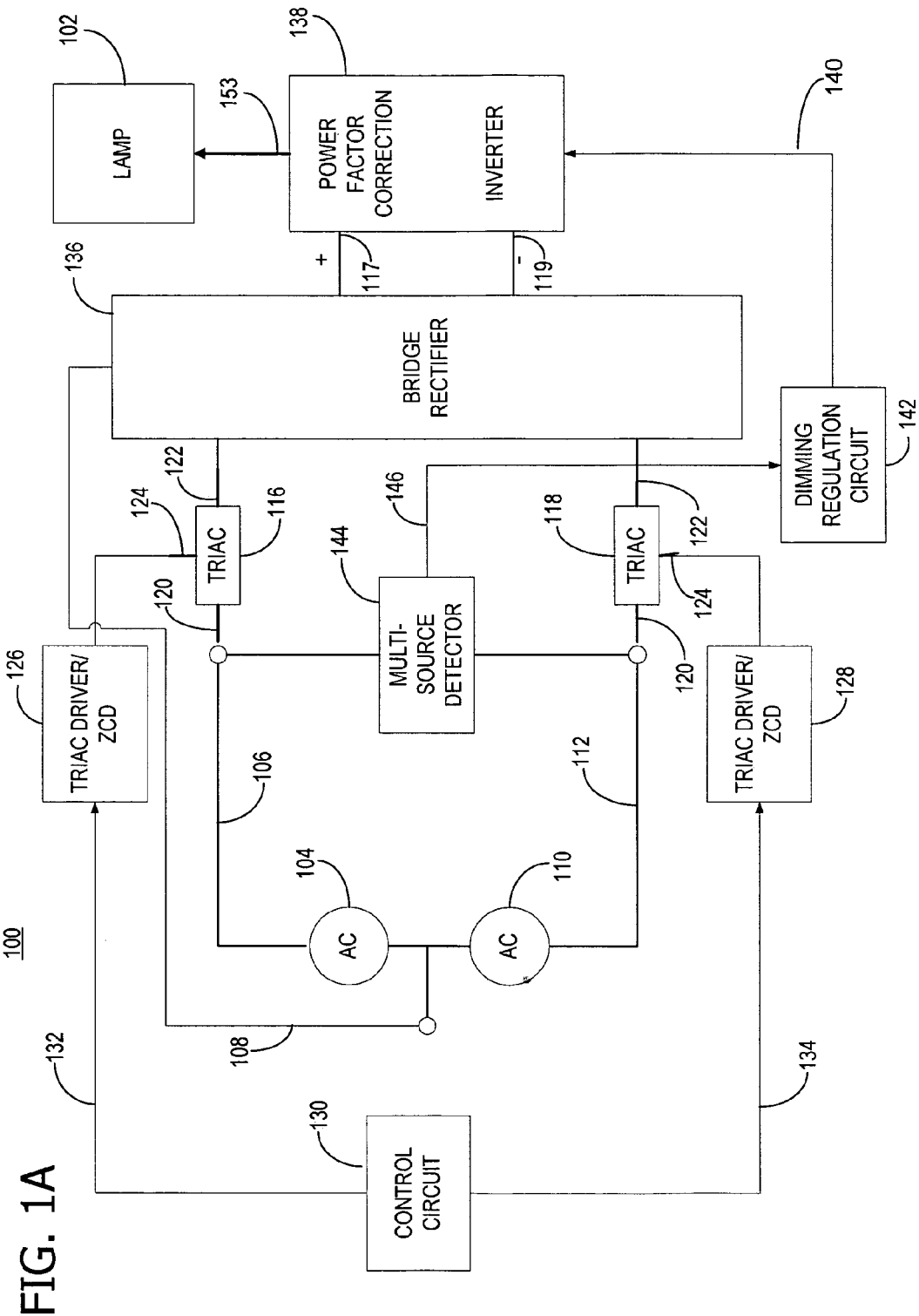
FIG. 1A is a block diagram illustrating a multi-phase input dimming ballast circuit for powering a lamp according to one preferred embodiment of the invention.
Figure 1B:
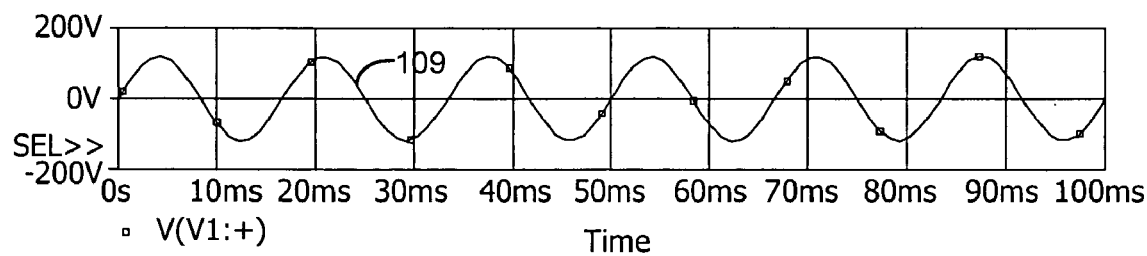
FIGS. 1B and 1C illustrate exemplary waveforms of AC voltage signals produced by AC voltage sources and provided as inputs to the triacs according to one preferred embodiment of the invention.
Figure 1C:
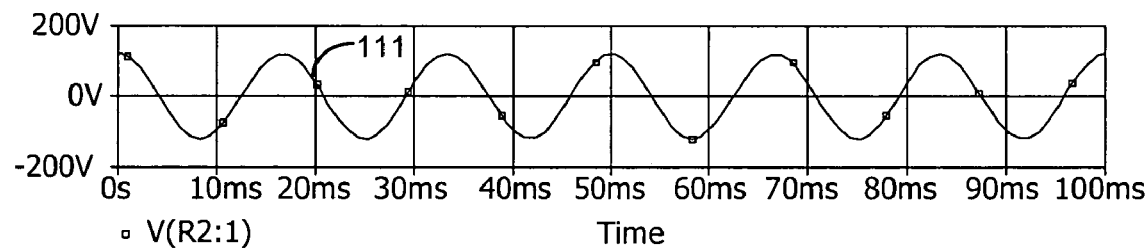

FIG. 1A is a block diagram of an embodiment of a multi-phase input dimming ballast 100 for powering a lamp 102. The ballast 100 receives power from a first AC power source 104 via power lines 106 and 108 and from a second AC power source 110 via power lines 112 and 108. The first AC power source 104 supplies a first AC voltage signal 109 (see FIG. 1B) having a particular phase via power lines 106 and 108, and the second AC power source 110 supplies a second AC voltage signal 111 (see FIG. 1C) having a different phase via power lines 112 and 108. The power lines 106 and 112 may be referred to as either "HOT" or "SUPPLY" and power line 108 may be referred to as "NEUTRAL" or "COMMON." Although the first and second AC voltage signals 109, 111 may have different phases; they generally have substantially the same voltage magnitude. FIGS. 1B and 1C show example waveforms of AC voltage signals 109, 111 produced by the first and second AC sources 104, 110, respectively. In this example, the phases of the signals are shifted approximately 90 degrees.

A first triac 116 is coupled to the AC power line 106 and outputs a first output AC voltage signal 113 for powering the lamp 102 via a rectifier 136 and power factor correction and inverter circuits 138. A second triac 118 is coupled to the AC power line 112 and outputs a second output AC voltage signal 115 for powering the lamp 102 via rectifier 136 and power factor correction and inverter circuits 138. Each of the first and second triacs 116, 118 have conduction terminals 120,122 and a gate terminal 124. Terminals 120 of the first triac 116 and the second triac 118 are coupled to AC power lines 106, 112, respectively. In order for triacs 116, 118 to output the first and second voltage signal 113, 115 between terminals 120 and 122, a threshold voltage must be applied to the gate terminal 124. In this embodiment, each of the triacs 116, 118 conducts for at least a full peak current (I/P) cycle of the corresponding AC signal or a few I/P cycles when the threshold voltage is applied to gate 124. However, as will be described in more detail below, the threshold voltage is applied to the triacs 116, 118 in an alternating fashion such that only one of the triacs 116, 118 conducts at a particular instant in time.

A first triac driver/zero crossing detector (ZCD) component 126 is coupled to the gate terminal 124 of the first triac 116 and supplies the required threshold voltage to activate the first triac 116. A second triac driver/zero crossing detector (ZCD) component 128 is coupled to the gate terminal 124 of the second triac 118 and supplies the required threshold voltage to activate the second triac 118. The first AC voltage signal is conducted from terminal 120 to terminal 122 of the first triac 116 when the first triac 116 is activated, and the second AC voltage signal is conducted from terminal 120 to terminal 122 of the second triac 118 when the second triac 118 is activated. The purpose of the ZCD portion of the first and second triac driver/zero crossing detector (ZCD) components 126, 128 is to fire the triacs 116,118 at the zero crossing of the AC I/P voltage signals 109 and 111. (See FIGS. 1B and 1C).

Figure 1D:
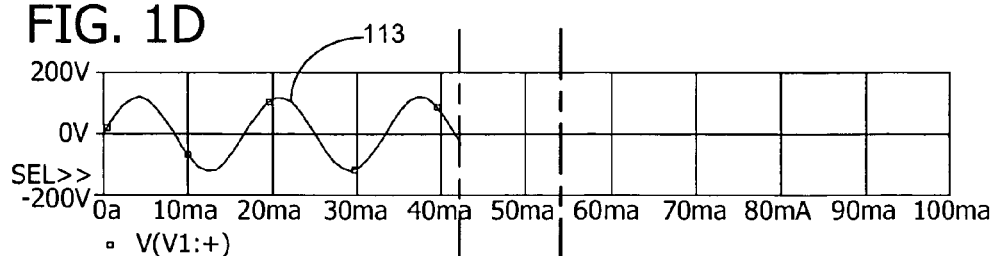
FIGS. 1D and 1E illustrate exemplary waveforms of AC voltage signals output from first and second triacs according to one preferred embodiment of the invention.
Figure 1E:
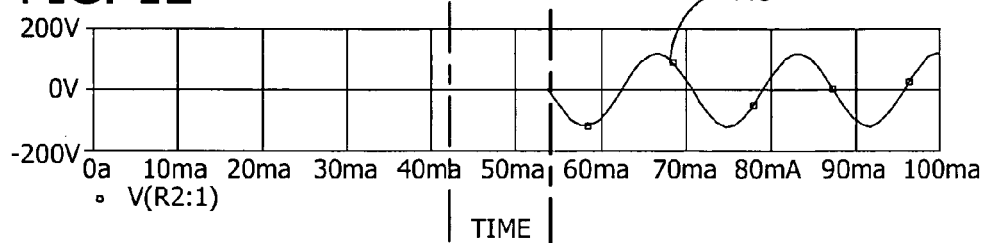
Figure 1F:
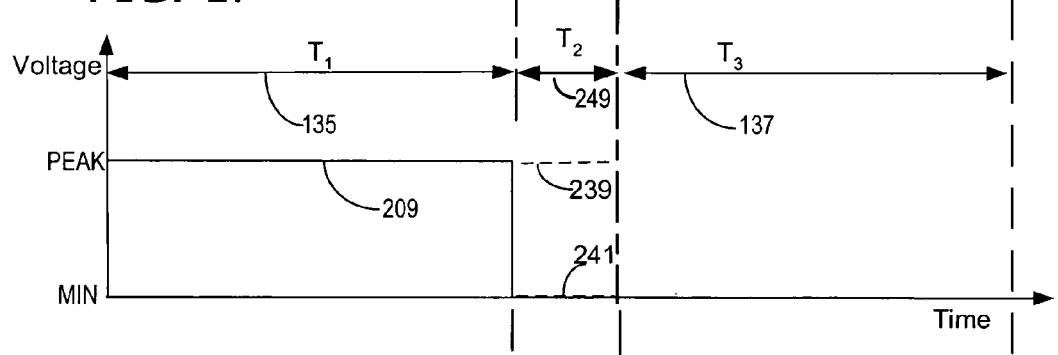
FIG. 1F illustrates exemplary waveforms of an output voltage signal produced by a pulse generator according to one preferred embodiment of the invention.

A control circuit 130 is coupled to the first and second triac driver/ZCD components 126, 128 and controls the first triac driver/ZCD 126 and the second triac driver/ZCD component 128 to alternatively provide the required threshold voltage to gate terminal 124 of the first and second triacs 116, 118, respectively. As a result, the control circuit 130 controls which one of the triacs 116, 118 will conduct during a given period of time. As described in more detail below in reference to FIG. 2, when both the first and second AC voltage signals are present, the control circuit 130 is configured to generate a first control signal 132 and a second control signal 134. The first and second control signals 132, 134 are complimentary in nature. That is, the first control signal 132 has a first state when the second control signal has a second state, and the first control signal 132 has the second state when the second control signal has the first state. For example, when the first control signal 132 has a peak magnitude (e.g., five volts), the second control signal 134 has a minimum magnitude (e.g., 0 volts), and when the first control signal 132 has the minimum magnitude the second control signal 134 has the peak magnitude (e.g. five volts). When a control signal having a peak magnitude is supplied to a particular one of the triac driver/ZCD components 126, 128, that particular the triac driver/ZCD component generates and provides the required threshold voltage to the gate terminal 124 and, thus, activates the corresponding triac. Thus, during operation the control circuit 130 causes the triac driver/ZCD components 126, 128 to activate triacs 116,118 in an alternating sequence when both first and second AC voltage signals are being supplied to the ballast 100. FIGS. 1D and 1E show example waveforms of the output AC voltage signals 113, 115 as produced by the first and second traics 116, 118, respectively. As it can be seen, the first and second output AC voltage signals 113, 115 are also complimentary. For example, during a first period of time, $T_1$, as indicated by reference character 135, the first triac 116 outputs the first output signal 113, and the second triac 118 does not produce an output signal. However, during a next period of time, $T_3$, as indicated by reference character 137, the second triac 118 outputs the second output signal 115, and the first triac 116 does not conduct an output signal.

A bridge rectifier 136 is coupled to the common line 108 and the terminal 122 of the first triac 116 to convert the first AC voltage signal output from the first triac 116 to a DC voltage signal, for application to a power factor correction (PFC)/inverter circuit 138 coupled thereto via lines 117 and 119. The bridge rectifier 136 is coupled to the common line 108 and the terminal 122 of the second triac 118 to convert the second AC voltage signal output from the second triac 118 to a DC voltage signal for application to the factor PFC/inverter circuit 138 via lines 117 and 119. Thus, when the first triac 116 conducts, the DC voltage signal applied to the PFC/inverter circuit 138 is a function of the first output AC voltage signal 113, and when the second triac 118 conducts, the DC voltage signal applied to the PFC/inverter circuit 138 is a function of the second output AC voltage signal 115. Notably, the bridge rectifier 136 converts each of the first and second output AC voltage signals 113, 15 into DC voltage signals having approximately the same magnitude.

The PFC/inverter circuit 138 controls the powering of the lamp 102 based upon power received from the rectifier 136 and a dim level command signal 140 received from a dimming regulation circuit 142. The PFC/inverter circuit 138 is configured to insure a high power factor and low current total harmonic distortion. The detailed operation of the PFC/inverter circuit 138 and is explained in greater detail in commonly owned U.S. Pat. No. 6,486,616, the disclosure of which is incorporated herein by reference.

A multi-source detection circuit 144 is coupled to the first AC power source 104 via power line 106 and coupled to the second AC power source 110 via power line 112. The multi-source detection circuit 144 generates a detection signal 146 that indicates whether one or both of the first and second AC voltage signals are being supplied to the ballast 100. For example, when both signals are being supplied, the multi-source detection circuit 144 generates a detection signal 146 having a low voltage magnitude (e.g., 0 volts). Alternatively, when at least one of the first and second AC voltage signals is absent (e.g., one source turned-off), the multi-source detection circuit 144 generates a detection 146 signal having a high voltage magnitude (e.g., 5 volts). As explained in more detail below in reference to FIG. 2, the control circuit 130 is responsive to an "off" state of one of the first or second AC sources for controlling the operation of the first and second triac driver/ZCD components 126, 128. For example, when one of the first or second AC sources 104, 106 is turned off, the control circuit will control triac driver/ZCD components such that power is continuously supplied from the AC voltage source in an "on" state.

The detection signal 146 can be provided to a dimming regulation circuit 142 to cause dimming of the lamp 102. The dimming regulation circuit 142 is responsive to the detection signal 146 to generate the dim level command signal 140 as a function of the amplitude of the detection signal 146. Preferably, the amplitude of the dim level command signal 140 determines the inverter running frequency, and the inverter running frequency determines whether dimming of the lamp 102 occurs. For example, when one of the first or second AC sources is turned off, the detection signal 146 will have a peak magnitude. This change in status of the detection signal 146 will cause the dimming regulation circuit 142 to generate a dim level command signal 140 that causes an increase in the inverter running frequency. More specifically, when one of the first or second AC sources 104, 110 is turned off, the detection signal 146 will have a peak amplitude and, thus, the dim level command signal 140 generated by the dimming regulation circuit 142 will have a peak amplitude. The inverter 138 is responsive to a dim level command signal 140 having a peak amplitude to operate at a increased frequency. Due to the increased operating frequency, the inverter 138 will provide an output signal 153 (i.e., lamp current) having a lower amplitude, causing the lamp 102 to dim. When both of the first and second AC sources 104, 110 are turned on, the detection signal 146 will have a minimum amplitude and the dim level command signal 140 generated by the dimming regulation circuit 142 will also have a minimum amplitude. The inverter 138 is responsive to a dim level command signal 140 having the minimum amplitude to operate at normal frequency. When operating at the normal frequency, the inverter 138 will provide an output signal 153 (i.e., lamp current) having a higher amplitude, causing the lamp 102 to brighten (i.e., to operate in a full light, or non-dimming, mode). Thus, the dimming regulation circuit 142 operates to reduce the power applied to the lamp 102 when one of the AC sources 104, 110 is not generating an AC signal.

Figure 2:
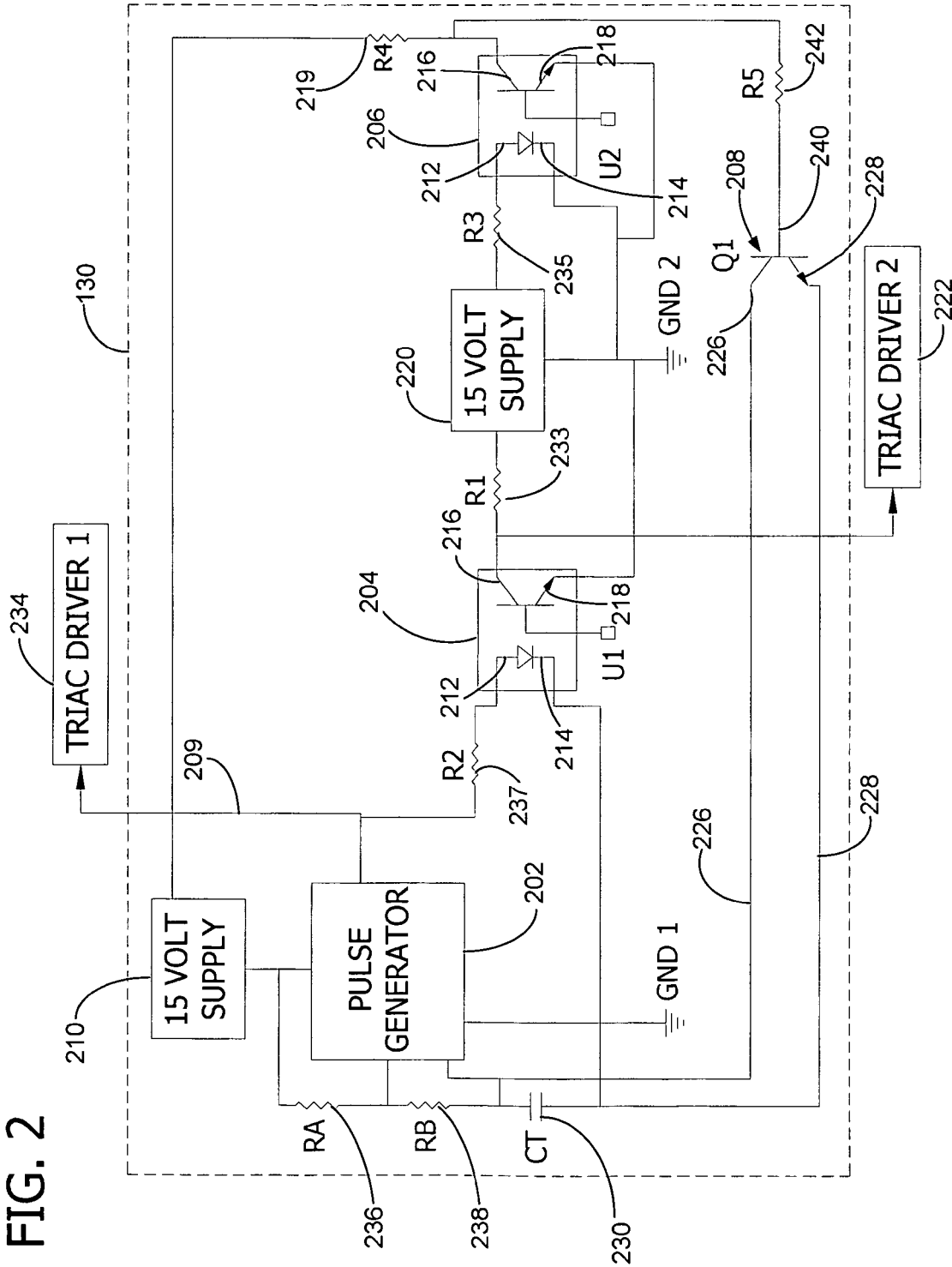
FIG. 2 is a schematic diagram illustrating the components of a control circuit according to one preferred embodiment of the invention.

Referring now to FIG. 2, a schematic diagram illustrates the components of a control circuit 130 according to one preferred embodiment of the invention. The control circuit 130 comprises a pulse generator 202, a first optocoupler 204, a second optocoupler 206, and a transistor 208. The pulse generator 202 preferably comprises an 8-pin integrated circuit such as a LM555 timer manufactured by National Semiconductor Corporation of Santa Clara, Calif., USA. The pulse generator 202 generates a pulsed output voltage signal 209 having two states that correspond to an on time and an off time. Power is supplied to the pulse generator 202 by a first DC voltage supply 210 (e.g., 15V) generated from the second AC voltage source (see FIG. 4).

The first and second optocouplers 204, 206 each include an anode 212, a cathode 214, a collector 216, and an emitter 218. The emitter 218 of each of the first and second optocouplers 204, 206 is coupled to ground. The cathode 214 of the second optocoupler 206 is also coupled to ground. The first DC power supply 210 is coupled to the collector 216 of the second optocoupler 206 via resistor 219. A second DC power supply 220 is coupled to the collector 216 of the first optocoupler 204 via a resistor 233, to the second triac driver 222 (e.g., triac driver 128) via resistor 233, and to the anode 212 of the second optocoupler 206 via resistor 235. A collector 226 of the transistor 208 is coupled to an input (e.g. pin 6) of pulse generator 202. The emitter 228 of the transistor 208 is coupled to a different input (e.g., pin 7) of the pulse generator 202 via a capacitor 230 and a resistor 232 and to the cathode 214 of the first optocoupler 204. A first triac driver 234 (e.g., triac driver 126) is coupled to the pulse generator 202 and receives the pulsed output signal 209. The pulsed output signal 209 controls the first triac driver 234 to turn the first triac 126 on and off. The anode 212 of the first optocoupler 204 is also coupled to the pulse generator 202 via a resistor 237 and receives the pulsed output signal 209.

As explained in more detail in reference to FIG. 4 below, the first and second DC voltage supplies are generated as a function of the first and second AC signals, respectively. During operation, if both the first and second AC signals 109, 111 are present, the pulse generator 202 generates the pulse output voltage signal that has a peak magnitude during an "on" time and minimum magnitude during an "off" time. In other words, the pulsed output signal alternates between a peak magnitude and a minimum magnitude. The "on" and off times time can be determined by the following equations:

$$\text{Time on}=1.1(R_A+R_B)*CT \quad (1)$$

$$\text{Time off}=1.1R_B*CT. \quad (2)$$

where $R_A$ corresponds to the value of resistor 236, $R_B$ corresponds to the value of resistor 238, and CT corresponds to the value of capacitor 230.

Figure 1G:
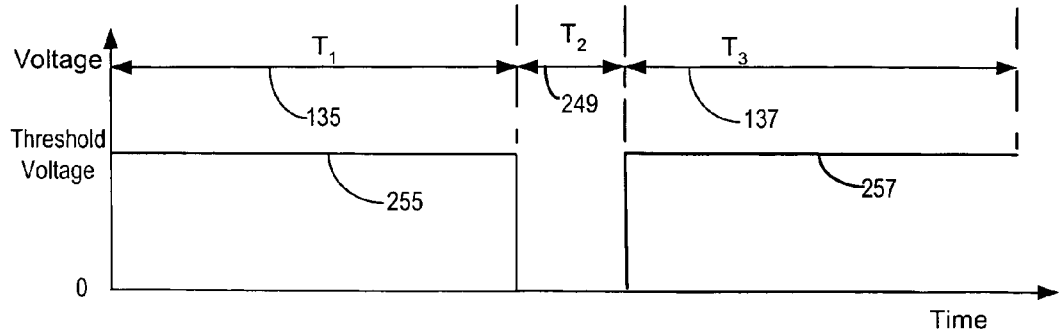
FIG. 1G illustrates exemplary threshold voltage signals applied to first and second triacs to generate the exemplary waveforms shown in FIGS. 1D and 1E.

When the pulsed output signal 209 has the peak magnitude (e.g., fifteen volts), the first triac driver 234 turns on and supplies the required threshold voltage to the first triac 116. Concurrently, the first optocoupler 204 turns on and pulls the supply of the second triac driver 222 to low. As a result, during the high pulse (i.e., peak magnitude) of the pulse generator 202, only the first AC voltage source 104 provides power to the ballast circuitry. (See FIG. 1D.) When the pulsed output signal 209 has the minimum magnitude, the first triac driver 234 turns off, and power cannot be supplied to the lamp 102 from the first AC voltage source 104. At the same time, the first optocoupler 204 turns off allowing the second DC voltage supply 220 to turn on the second triac driver 222 to supply the required threshold voltage to the second triac 128. Accordingly, during the low pulse (i.e., minimum magnitude) of the pulse generator 202, only the second AC voltage source 110 provides power to the ballast circuitry. (See FIG. 1E). FIG. F shows an example waveform of a pulsed output signal 209 produced by pulse generator 202. In this example, during the first period of time, $T_1$, as indicated by reference character 135, the pulse generator 202 generates a pulsed output signal 209 having a peak magnitude (high), as indicated by line 239. During a next period of time, $T_3$, as indicated by 137, the pulse generator 202 generates a pulsed output signal 209 having a minimum magnitude (low), as indicated by line 241. Referring again to FIGS. 1D and 1E, it can be seen that when the pulsed output signal is high, the first AC voltage source 104 provides power to the ballast circuitry. Alternatively, it can be seen that when the pulsed output signal 209 is low, the second AC voltage source 110 provides power to the ballast circuitry. More specifically, as shown in FIG. 1G, when the pulse generator 202 generates a pulsed output signal 209 having a peak magnitude (high), the threshold voltage, as indicated by reference character 255, is applied to the gate 124 of the first triac 116 and the first triac 116 conducts such that the first AC voltage source 104 provides power to the ballast circuitry. On the other hand, when generator 202 generates a pulsed output signal 209 having a minimum magnitude (low), the threshold voltage, as indicated by reference character 257, is applied to the gate 124 of the second triac 118 and the second triac 118 conducts such that the second AC voltage source 110 provides power to the ballast circuitry. However, because the ZCD portion of the first and second triac driver/zero crossing detector (ZCD) components 126, 128 will cause the triacs 116, 118 to fire (i.e., conduct) at the zero crossing of the AC voltage signals 109 and 111, there is a period of time $T_2$ (i.e., dead time), as indicated by reference character 249 shown in FIG. 1G, during which both triacs remain 116, 118 off (i.e., do not conduct) and power is not drawn from the AC input supplies 104, 110. During time $T_3$, a DC link capacitor (not shown) connected between diode bride rectifier 136 and the PFC inverter 138 discharges to supply power to the inverter 138 and drive the load (e.g., lamp 102).

When only one of the first and second AC voltage sources 104, 110 is on, the control circuit 130 is configured to continuously supply power to the ballast circuitry from that particular AC voltage source. For example, if the first AC voltage source 104 is turned off and second AC volt source 110 is on, the first DC voltage supply 210 (which is energized by source 104; see FIG. 4) drops to zero (0) volts and the pulse generator 202 cannot be activated because there is insufficient voltage to trigger operation of the pulse generator 202. When the pulse generator 202 is off, there is no pulsed output signal 209 being generated and the first triac driver 234 remains off. As described above, when the magnitude of the pulsed output signal 209 of the pulse generator 202 is low (e.g., zero), the first optocoupler 204 is off and the second DC voltage supply 220 turns on the second triac driver 222 to continuously supply the required threshold voltage to the gate 124 of second triac 118. As a result, the second AC voltage source 110 provides continuous power to the ballast circuitry when the first AC voltage source 104 is off.

Alternatively, if the first AC voltage source 104 on and second AC voltage source 110 is off, the first DC voltage supply 210 supplies sufficient voltage to trigger operation of the pulse generator 202, and the pulse generator 202 generates the pulsed output signal 209. Since the second DC voltage supply 220 (which is energized by source 110; see FIG. 4) is zero (0) volts, the second triac driver 222 cannot supply the threshold voltage required to activate the second triac 118. In addition, when the second DC voltage supply 220 is off, the second optocoupler 206 does not conduct. The voltage from the first DC voltage supply 210 is pulled down by resistors 236 and 238 to supply the required voltage to a gate 240 of the transistor 208 via resistor 242 to turn on the transistor 208. When the transistor 208 turns on, a threshold input (e.g., pin 6) of the pulse generator 202 is pulled down to ground. As a result, the pulse generator 202 provides an output signal having a continuously high magnitude to the first triac driver 234. Accordingly, only the first AC voltage source 104 provides power to the ballast circuitry.

Figure 3:
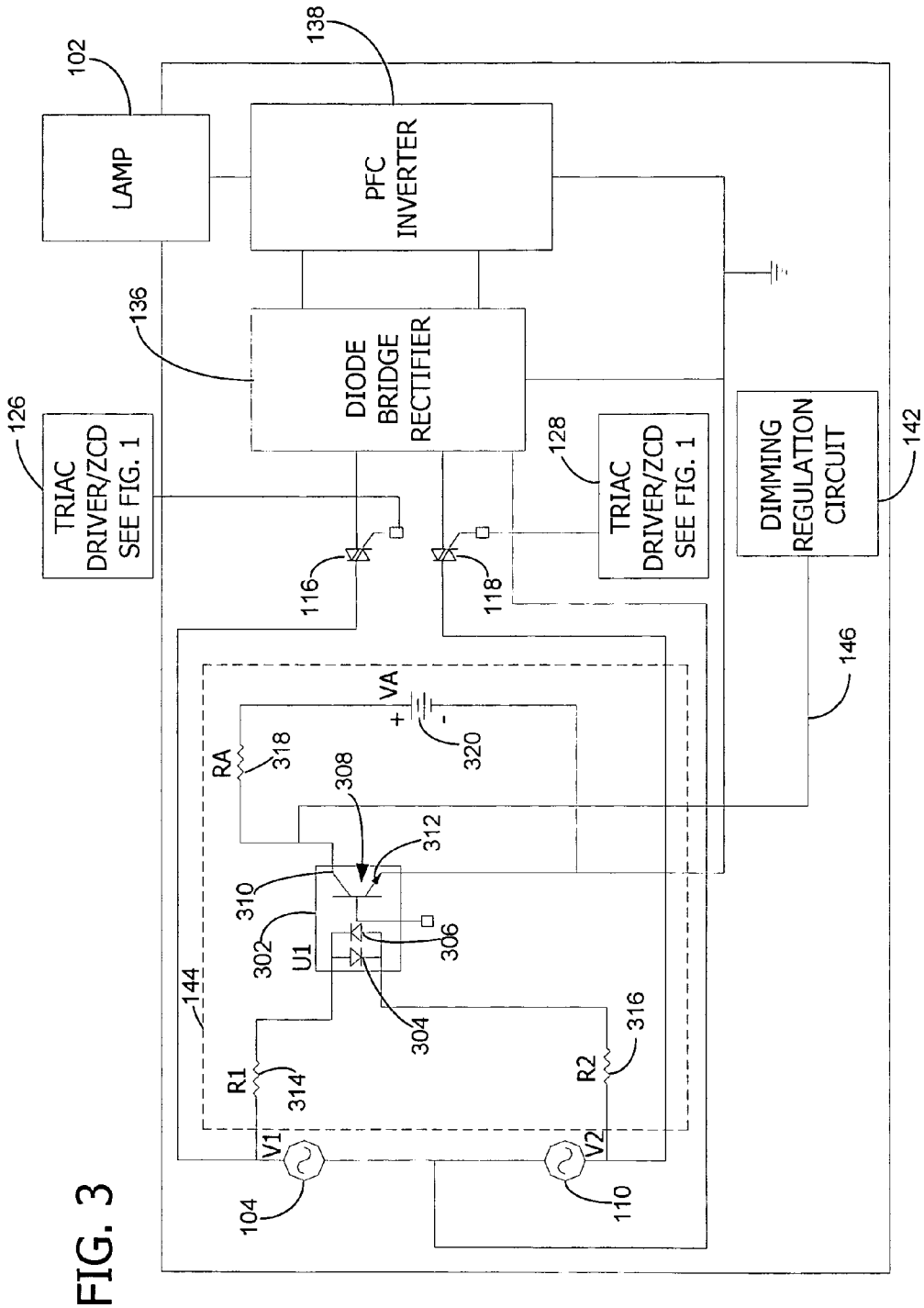
FIG. 3 is a schematic diagram illustrating the components of a multi-source detector according to one preferred embodiment of the invention.

Referring now to FIG. 3, a schematic diagram illustrates the components of a multi-source detection circuit 144 according to one preferred embodiment of the invention. The multi-source detection circuit 144 includes a dual diode optocoupler 302 that produces the detection signal 146 to indicate whether both the AC voltage sources 104, 110 are supplying power to the circuit. The dual diode optocoupler 302 can be a HMHAA 280 dual diode optocoupler such as manufactured by Fairchild Semiconductor of South Portland, Me. The dual diode optocoupler 302 includes optodiodes 304, 306 and a transistor 308. When one of the first and second AC sources 104, 110 is turned off, none of the opto-diodes conduct, and the transistor 308 of the optocoupler 302 will not allow current to flow from the collector 310 to the emitter 312. As a result, a voltage is generated across the collector 310 and emitter 312 of the transistor 308. This generated voltage is used as the detection signal 146 to indicate whether both the AC voltage sources 104, 110 are supplying power to the ballast circuitry. Thus, when the optocoupler 302 is off, the magnitude of the detection signal 146 is high. However, when both AC sources are turned on, both optodiodes 304, 306 conduct and the transistor 308 of the optocoupler 302 allows current to flow from the collector 310 to the emitter 312. When the opto-coupler 302 turns on there is a minimal voltage, across collector 310 and emitter 312, and, thus, the magnitude of the detection signal 146 is low. The detection signal 146 can be used to decrease (i.e., dim) the brightness of the lamp connected to the ballast when the detection signal 146 has a high magnitude, which indicates that only one of the AC sources 104, 110 is supplying power. Resistors 314, 316 limit the current that is provided to the optodiodes 304, 306 respectively. Resistor 318 limits current being supplied from a DC voltage source (e.g., DC voltage supply 210).

Figure 4:
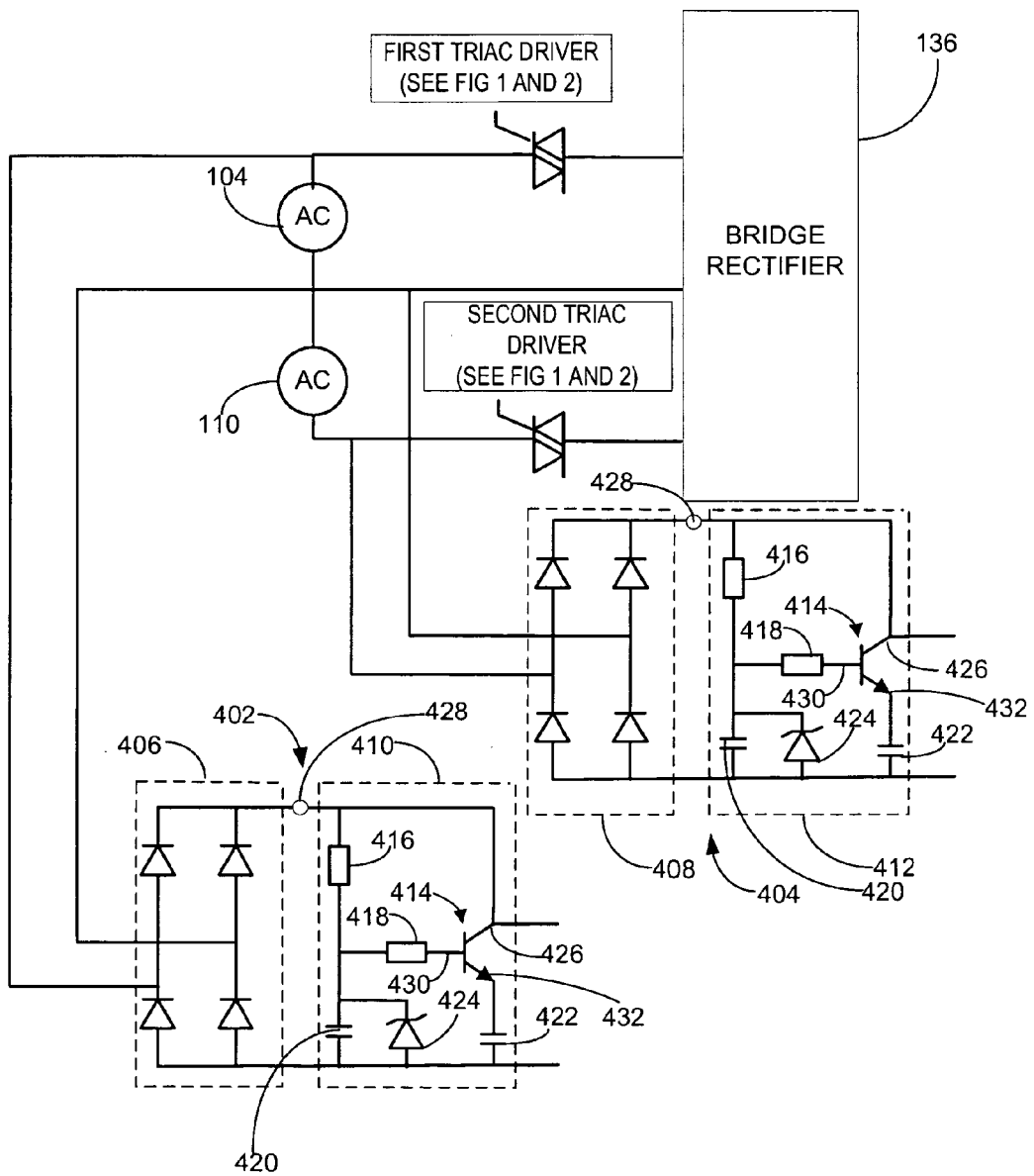
FIG. 4 is a schematic diagram illustrates the components of first and second 15 volt DC voltage circuits according to one embodiment of the invention.

Referring now to FIG. 4, a schematic diagram illustrates the components of a first DC voltage supply circuit 402 (e.g., DC power supply 210) and a second DC voltage supply circuit 404 (e.g., DC power supply 220) according to one embodiment of the invention. The first and second AC voltage sources 104, 110 are connected to full wave rectifiers 406, 408 respectively. In the first DC voltage supply circuit 402, the rectifier 406 rectifies the first AC signal from the first AC voltage source 104 to produce a first DC voltage signal. In the second DC voltage supply circuit 404, the rectifier 408 rectifies the second AC signal from the second AC voltage source 110 to produce a second DC voltage signal. The first and second DC voltage signals are regulated to produce first and second DC supply voltages. In this embodiment, a first regulation circuit 410 is used to produce the first DC supply voltage, and a second regulation circuit 412 is used to produce the second DC supply voltage. Each of the regulation circuits 410, 412 includes a transistor 414, a first resistor 416, a second resistor 418, a first capacitor 420, a second capacitor 422, and a zener diode 424. A collector 426 of the transistor 414 is connected to terminal 428. The base 430 of the transistor 414 is coupled to terminal 428 by first and second resistors 416 and 418, and is coupled to ground via the second resistor 418 and the first capacitor 420, which is in parallel with the zener diode 424. The emitter 432 is connected to ground via the second capacitor 422. In this embodiment, the voltage produced across the second capacitor 422 is the target DC supply voltage and has a magnitude of approximately 15 volts. Accordingly, the first and second DC voltage supply circuits 402, 404 can be used as the first and second DC voltage supplies 210, 220, respectively, described above in reference to FIG. 2.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

The invention claimed is:

1. A ballast circuit for powering at least one lamp, the ballast circuit being connected to a first alternating current (AC) source having a first phase and to a second AC source having a second phase, said ballast circuit comprising:
   a rectifier circuit;
   an inverter circuit coupled between the rectifier circuit and the lamp;
   a first switching circuit coupled between the first AC source and the rectifier circuit, and operative to selectively connect the first AC source to the rectifier circuit;
   a second switching circuit coupled between the second AC source and the rectifier circuit, and operative to selectively connect the second AC source and the rectifier circuit; and
   a control circuit operative to control the first and second switching circuits to provide power from one of the first and second AC sources to the lamp via the rectifier circuit and the inverter circuit.

2. The ballast circuit of claim 1 further comprising a detection circuit connected between the first and second AC sources for generating a detection signal representative of whether power is being supplied by each of the first and second AC sources.

3. The ballast circuit of claim 2, wherein a magnitude of a voltage parameter of the detection signal has a first value when both of the first and second AC sources are supplying power and wherein the magnitude of the voltage parameter has a second value when only one of the first and second AC sources is supplying power, and wherein the detection signal is provided to a dimming regulation circuit, wherein the dimming regulation circuit is responsive to detection signal to generate a dim level command signal to control a dimming of the lamp.

4. The ballast circuit of claim 2, wherein the detection circuit is a dual diode optocoupler connected between the first and second AC sources.

5. The ballast circuit of claim 1, wherein the control circuit generates a first control signal for controlling the first switching circuit and a second control signal for controlling the second switching circuit, and wherein the first and second control signals are complimentary.

6. The ballast circuit of claim 5, wherein the first control signal is in a first state when the second signal is in a second state, and wherein the first control signal is in the second state when the second signal is in the first state, and wherein the first switching circuit provides power to the lamp when first control signal is in the first state, and wherein the second switching circuit provides power to the lamp when the second control signal is in the first state.

7. The ballast circuit of claim 1, wherein the first switching circuit includes a first triac driver connected to a first triac, said first triac connected between the first AC source and the lamp, wherein the second switching circuit includes a second triac driver connected to a second triac, said second triac connected between the second AC source and the rectifier circuit, and wherein the control circuit alternatively controls the first and second triac drivers to control the first and second triacs to provide power from one of the first and second AC sources to the lamp.

8. The ballast circuit of claim 7, wherein the first AC source generates a first AC voltage signal and the second AC source generates a second AC voltage signal, wherein each of the first and second AC voltage signals have a frequency, said frequency corresponding to cycles of the first and second AC voltage signals completed in a second, and wherein the control circuit alternatively controls the first and second triac drivers to control the first and second triacs to provide power from one of the first and second AC sources to the lamp for a period of time corresponding to at least one complete cycle of the first and second AC voltage signals.

9. The ballast circuit of claim 2, wherein:
the rectifier circuit comprises a bridge rectifier, said bridge rectifier being coupled between the first switching circuit and the lamp for converting the first AC voltage signal output from the switching circuit to a first DC voltage signal, and being coupled between the second switching circuit and the lamp for converting the second AC voltage signal output from the second switching circuit to a second DC voltage signal; and
the inverter circuit is connected to the bridge rectifier and the dimming regulation circuit for controlling an amount of power being provided to the lamp as a function of the first DC voltage signal and the dim level command signal, or as a function of the second DC voltage and the dim level command signal.

10. The ballast circuit of claim 9, wherein the inverter circuit produces an output signal for powering the lamp, wherein the output signal has a first frequency when the dim level command signal has a peak amplitude, and wherein the output signal has a second frequency when the dim level command signal has a minimum amplitude, and wherein the lamp is responsive to the output signal having the first frequency for powering the lamp in a dimming mode, and wherein the output signal has the second frequency for powering the lamp in a non-dimming mode.

11. The ballast circuit of claim 1, wherein the control circuit comprises:
a pulse generator generating an alternating output signal and connected to the first switching circuit, wherein the first switching circuit is responsive to a first state of the alternating output signal to provide power from the first AC source to the lamp, and wherein the first switching circuit is responsive to a second state of the alternating output signal to interrupt power being supplied from the first AC source to the lamp.

12. The ballast circuit of claim 11, wherein the control circuit further comprises:
a first DC voltage supply supplying power to the pulse generator,
a second DC voltage supply supplying power to the second switching circuit; and
a first switch for receiving the alternating output signal from the pulse generator, wherein said first switch is responsive to the first state of the alternating output signal to interrupt power being supplied to the second switching circuit from the second DC voltage supply, wherein said second switching circuit is responsive to the interruption in power to prevent power from being supplied from the second AC source to the lamp, and wherein said first switch is responsive to the second state of the alternating output signal to provide power from the second DC voltage supply to the second switching circuit, wherein the second switching circuit is responsive to the power received from the second DC power supply to provide power from the second AC source to the lamp.

13. The ballast circuit of claim 12, wherein the control circuit further comprises a second switch receiving a first DC power signal representative of an amount of power being supplied from the first DC power and receiving a second DC power signal representative of an amount of power being supplied from the second DC power supply, wherein the second switch continuously allows power from the first AC source to be provided to the lamp when the second DC power signal indicates the second DC power supply is off, and wherein the second switch continuously allows power from the second AC source to be provided to the lamp when the first DC power signal indicates the second DC power supply is off.

14. The ballast circuit of claim 12, wherein the first DC voltage supply is generated as a function of a first AC input signal being supplied by the first AC source, and wherein the second DC voltage supply is generated as a function of a second AC input signal being supplied by the second AC source.

15. A method for powering a lamp connected to a ballast circuit, the method comprising the steps of:
supplying a first input signal and a second input signal to the circuit;
generating a first complimentary control signal and a second complimentary control signal;
providing power from one of the first and second input signals to the lamp as a function of the first and second complimentary control signals;

detecting a magnitude of a parameter of the first input signal and a magnitude of corresponding parameter of the second input signal; and dimming the lamp when the detected magnitude of the parameter of the first input signal or the detected magnitude of the corresponding parameter of the second input signal is less than or equal to a threshold value.

16. The method of claim 15, wherein the first control signal has a parameter having a peak magnitude when the second control signal has corresponding parameter having a minimum magnitude, and wherein the parameter of the first control signal has the minimum magnitude when the corresponding parameter of the second control signal has the peak magnitude.

17. The method of claim 16, wherein providing power includes powering the lamp via the first input signal when the parameter of the first control signal has the peak magnitude, and powering the lamp via the second input signal when the corresponding parameter of the second control has the peak magnitude.

* * * * *